United States Patent [19]
Yamashita

[11] Patent Number: 5,493,346
[45] Date of Patent: Feb. 20, 1996

[54] SIGNAL DEMODULATING APPARATUS CAPABLE OF EFFECTIVELY SUPPRESSING THE BEAT INTERFERENCE CAUSED BY THE PILOT SIGNAL

[75] Inventor: Noriyuki Yamashita, Tokyo, Japan

[73] Assignee: Sony Corporation, Tokyo, Japan

[21] Appl. No.: 83,283

[22] Filed: Jun. 29, 1993

[30] Foreign Application Priority Data

Jul. 3, 1992 [JP] Japan .................................. 4-200399
Jul. 3, 1992 [JP] Japan .................................. 4-200400

[51] Int. Cl.$^6$ ........................... H04N 5/455; H04N 9/89; G11B 5/02
[52] U.S. Cl. ........................... 348/726; 358/323; 360/27
[58] Field of Search ........................... 358/323, 337; 360/36.1, 27; 348/726, 727; 381/13; H04N 5/455, 9/89

[56] References Cited

U.S. PATENT DOCUMENTS

| | | | |
|---|---|---|---|
| 3,571,526 | 3/1971 | Stockwell et al. | 360/24 |
| 4,680,792 | 7/1987 | Tanaka et al. | 381/12 |
| 4,815,141 | 3/1989 | Carver et al. | 381/94 |
| 5,032,925 | 7/1991 | Ganse et al. | 360/27 |
| 5,062,005 | 10/1991 | Kitaura et al. | 348/735 |

FOREIGN PATENT DOCUMENTS 0433032 6/1991 European Pat. Off. ......... H04N 5/91

OTHER PUBLICATIONS

Patent Abstracts Of Japan vol. 8, No. 55 (P-260) 13 Mar. 1984 & JP-A-58 203 605 (PAIONIA) 28 Nov. 1983.
Patent Abstracts Of Japan vol. 11, No. 254 (E-533) 18 Aug. 1987 & JP-A-60 064 178 (Hitachi) 23 Mar. 1987.

*Primary Examiner*—Victor R. Kostak
*Assistant Examiner*—John W. Miller
*Attorney, Agent, or Firm*—William S. Frommer; Alvin Sinderbrand

[57] ABSTRACT

A signal demodulating apparatus for demodulating FM video signals on which a pilot signal is mixed. The apparatus comprises an input circuit, a first deriving circuit, a pilot canceling signal generating circuit, a mixing circuit, a limiter and a demodulator. The input circuit admits the pilot signal-mixed frequency-modulated video signals. The first deriving circuit connected to the input circuit derives the pilot signal from the pilot signal-mixed frequency-modulated video signals. The pilot canceling signal generating circuit connected to the first deriving circuit generates a pilot canceling signal based on the derived pilot signal. The mixing circuit connected to the input circuit and the pilot canceling signal generating circuit mixes the pilot signal-mixed frequency-modulated video signals and the pilot canceling signal. The limiter connected to the mixing circuit limits the pilot-canceled frequency-modulated video signals to a predetermined level. The demodulator connected to the limiter demodulates the frequency-modulated video signals.

15 Claims, 11 Drawing Sheets

TIP OF VECTOR Fc MOVES VERTICALLY ALONG THIS LINE (FM).

TIP OF VECTOR Fc MOVES CROSSWISE ALONG THIS LINE (AM).

F I G. 9(A)
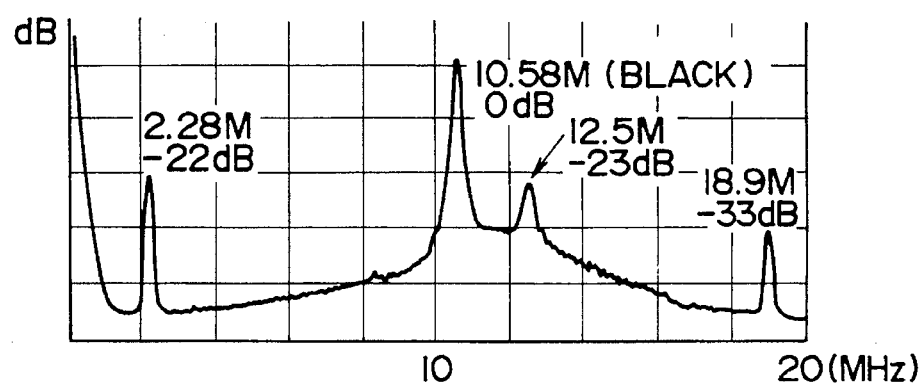
F I G. 9(B)
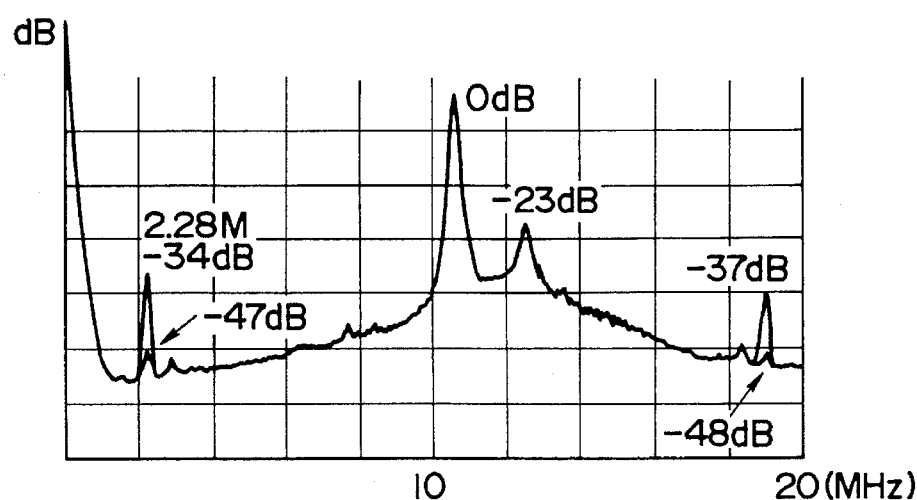
F I G. 9(C)
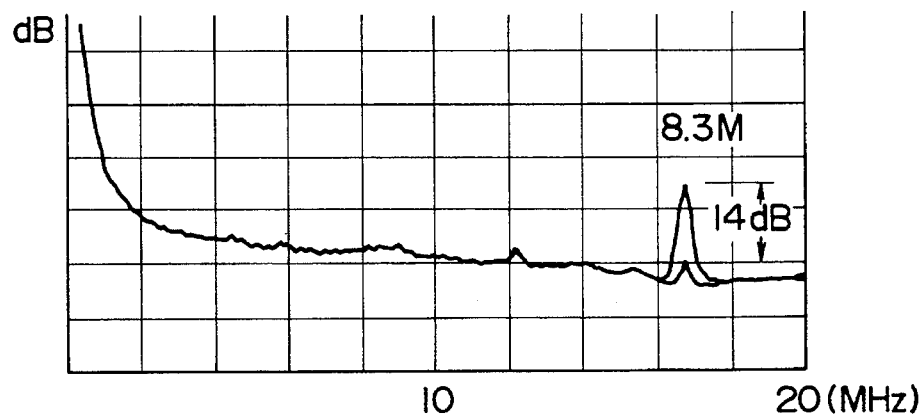

SIGNAL DEMODULATING APPARATUS CAPABLE OF EFFECTIVELY SUPPRESSING THE BEAT INTERFERENCE CAUSED BY THE PILOT SIGNAL

BACKGROUND OF THE INVENTION

1. Field of the Invention

The present invention relates to a signal demodulating apparatus for use with video disc players that reproduce data from video discs having video signals recorded thereon in the so-called MUSE (multiple sub-nyquist sampling encoding) format for the Japanese high-definition television known as Hi-vision.

2. Description of the Prior Art

FIG. 1 is a block diagram of a recording apparatus for recording Hi-vision video signals in the MUSE format onto video discs. In FIG. 1, an FM modulator 51 frequency-modulates input video signals on a 12.5 MHz carrier by an input video signals and supplies an FM signal fc to an adder 52. The frequency deviation of the FM signal fc is ±1.9 MHz, and the black and white levels thereof are 10.6 (=12.5−1.9) MHz and 14.4 (=12.5+1.9) MHz, respectively. The adder 52 is also fed with a pilot signal fl at 2.3 MHz (=$f_H$×135/2; where $f_H$ stands for the horizontal scanning frequency). The pilot signal is used in TBC (time base corrector) and spindle servo upon playback. The adder 52 adds the FM signal fc and pilot signal fl and supplies the result to a limiter 53. In turn, the limiter 53 limits the amplitude of the received signal to a predetermined level. The output signals from the limiter 53 are supplied to a laser disc cutting machine that records the signals onto video discs. FIG. 2 is a view of the frequency allocation of MUSE-format signals recorded on video discs.

When the limiter 53 limits the amplitude of the mixed signal composed of the FM signal (main carrier) fc and pilot signal fl, there are generated a lower sideband fp and an upper sideband fp+. That is, as shown in FIG. 3 (A), addition of the pilot signal fl to the FM signal fc causes a vector F1 related to the pilot signal fl to rotate around the tip of a vector Fc of the FM signal fc in accordance with the phase change in the pilot signal fl. Consequently, the mixed signal has not only the phase change (i.e., frequency-modulated component) but also the amplitude change (i.e., amplitude-modulated component).

When the amplitude of the mixed signal is limited to a predetermined level, as depicted in FIG. 3 (B), the vector F1 is formed from two vectors: vector Fp related to the lower sideband fp, and vector Fp+ related to the upper sideband fp+. Even if the vectors Fp and Fp+ rotate in accordance with the phase change, the vector F1 does not rotate; a length of the vector F1 varies in the direction perpendicular to the vector Fc. At this time, the amplitude of the vectors Fp and Fp+ becomes half that of the vector Fl. Both the lower sideband fp and the upper sideband fp+ are recorded on the video disc together with the FM signal fc.

When the frequency of the FM signal fc is 10.6 MHz (i.e., when the picture appears blackish), the frequency allocation of the mixed signal is as shown in FIG. 4. And when the mixed signal is supplied the limiter 53, the upper sideband fp+ at 18.9 (=10.6+8.3) MHz is generated, as illustrated in FIG. 5. That frequency is higher than the frequency fc (=10.6 MHz) of the main carrier by 8.3 (=10.6−2.3) MHz, i.e., by the difference between the frequency of the main carrier fc and that of the pilot signal fp. A signal phase of the upper sideband fp+ is opposite to a signal phase of the lower sideband fp.

FIG. 6 is a view showing the frequency band of the base band MUSE signal. As illustrated, the MUSE frequency band has a range of up to about 8.1 MHz. Meanwhile, an interference beat carrier derived from the difference between the main carrier (FM signal) fc and the pilot signal fp is 8.3 (=10.6−2.3) MHz. Because the interference beat carrier is close to the MUSE frequency band, it appears as a stripe noise pattern in the picture. Where the frequency of the main carrier fc is near 14.4 MHz (i.e., when the picture appears whitish), the frequency of the interference beat carrier is 12.1 (=14.4−2.3) MHz. The latter frequency is appreciably higher than the MUSE frequency band of up to 8.1 MHz, so that the presence of the interference beat carrier becomes negligible. It follows that beat interference is insignificant when the picture is on the dark side.

Conventionally, the pilot signal (lower sideband) fp in the 2.3 MHz band is removed from the RF signal reproduced from the video disc before the main carrier fc is frequency-demodulated. However, the upper sideband fp+ contained in the reproduced signal of the video disc makes it impossible to fully suppress the beat component even after removal of the lower sideband fp.

Conventional attempts to remove the upper sideband fp+ have largely failed because the upper sideband frequency is dependent on the frequency of the main carrier fc and is thus variable. In addition, the interference beam carrier near 8.3 MHz is difficult to remove because that frequency band is close to the proper frequency band of the MUSE system.

These disadvantages of the prior art have contributed to making full suppression of the interference from the pilot signal difficult to accomplish.

SUMMARY OF THE INVENTION

It is therefore an object of the invention to overcome the above and other deficiencies and disadvantages of the prior art and to provide a signal demodulating apparatus capable of effectively suppressing the beat interference caused by the pilot signal.

In carrying out the invention and according to one aspect thereof, there is provided a signal demodulating apparatus for demodulating frequency-modulated video signals on which a pilot signal is mixed, comprising: input means for admitting the pilot signal-mixed frequency-modulated video signals; first deriving means connected to the input means for deriving the pilot signal from the pilot signal-mixed frequency-modulated video signals; pilot canceling signal generating means connected to the first deriving means for generating a pilot canceling signal based on the derived pilot signal; mixing means connected to the input means and the pilot canceling signal generating means for mixing the pilot signal-mixed frequency-modulated video signals and the pilot canceling signal; limiting means connected to the mixing means for limiting the pilot-canceled frequency-modulated video signals to a predetermined level; and demodulating means connected to the limiting means for demodulating the frequency-modulated video signals.

In a preferred structure according to the invention, the first deriving means is a band-pass filter connected to a phase locked loop (PLL) circuit. The output of the PLL circuit is connected to a time base corrector (TBC) circuit for correcting any time base error in the output from the demodulating means. In this setup, the frequency-modulated video signals are mixed with a signal whose phase is opposite to that of the pilot signal and whose level is double that of the pilot signal. This makes it possible to suppress the pilot signal effectively.

In another preferred structure according to the invention, an inverter is used to invert the phase of the output from a PLL circuit connected to a band-pass filter, the output being fed to a phase shift circuit. This structure, employed where FM signals are reproduced from a disc, allows the phase of the PLL output to be inverted upon a track jump of the reproducing position on the disc. Another band-pass filter is provided by which to extract a pilot signal from the FM signals, the pilot signal being balanced-modulated by balanced modulators for output to an adder which adds the balanced-modulated pilot signal to the FM signals.

In a further preferred structure according to the invention, the pilot signal component in the output signal from the limiting means is extracted by the band-pass filter. The level of the extracted pilot signal component is synchronously detected by synchronous detectors. In accordance with the detected level, the balanced modulators balanced-modulate a first and a second signal generated by the phase shift circuit. The adder adds (or subtracts) the two phase-shifted signals to (or from) the FM signals. This setup thus allows the phase and level of the added signals to be adjusted automatically.

In a yet further preferred structure according to the invention, the balanced-modulated output of the balanced modulators is added to the FM signals in a manner dependent on the output frequency of the demodulating means. This setup suppresses interference illustratively in dark pictures.

These and other objects, features and advantages of the invention will become more apparent upon a reading of the following description and appended drawings.

BRIEF DESCRIPTION OF THE DRAWINGS

FIG. 9A–9C are a set of frequency spectrum diagrams showing how the embodiment of FIG. 7 works;

DESCRIPTION OF THE PREFERRED EMBODIMENTS

Figure 1:
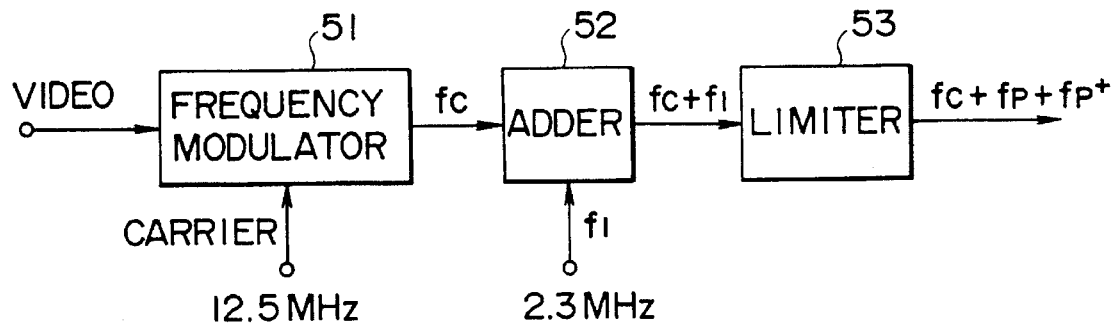
FIG. 1 is a block diagram of a recording apparatus for recording Hi-vision video signals of the MUSE format onto video discs.
Figure 2:
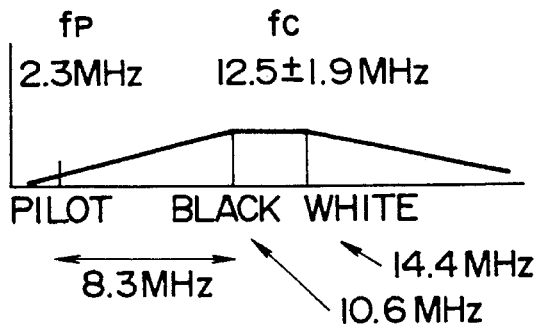
FIG. 2 is a view of the frequency allocation of MUSE-format signals recorded on video discs.
Figure 3A:
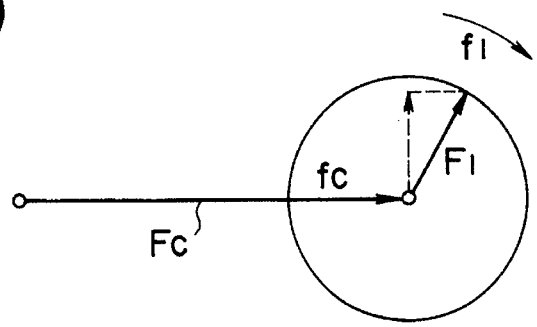
FIG. 3A–3B are a set of views showing how upper and lower sidebands of a pilot signal are generated by a limiter 53 in FIG. 1.
Figure 3B:
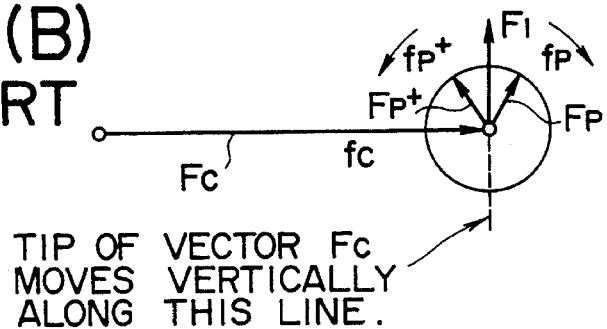
Figure 4:
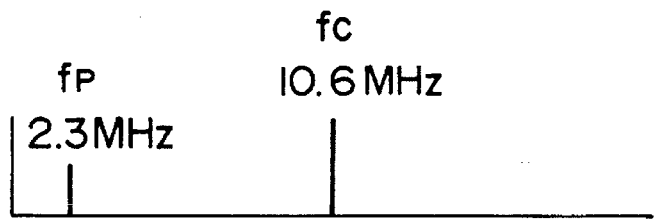
FIG. 4 is a view of a frequency spectrum in the input to the limiter 53 in FIG. 1.
Figure 5:
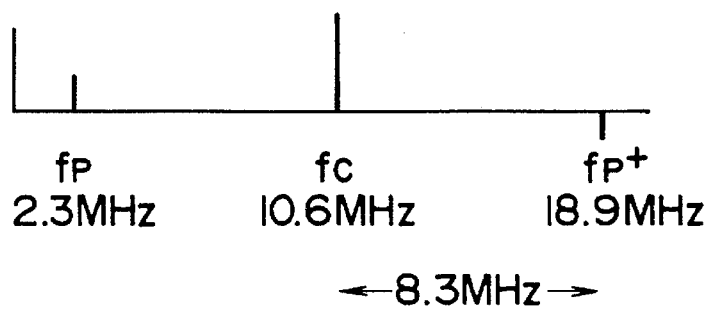
FIG. 5 is a view of a frequency spectrum in the output from the limiter 53 in FIG. 1.
Figure 6:
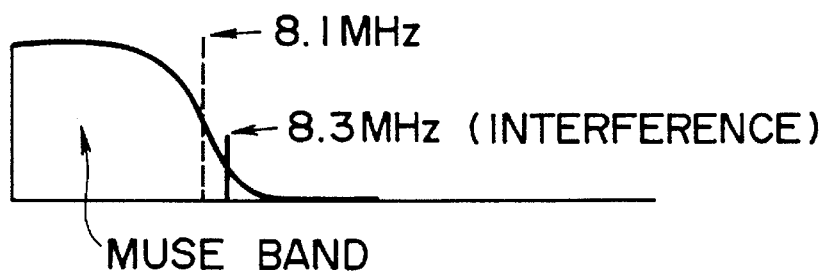
FIG. 6 is a view depicting how beat interference is caused by the pilot signal when a conventional MUSE-format video disc is played back.
Figure 7:
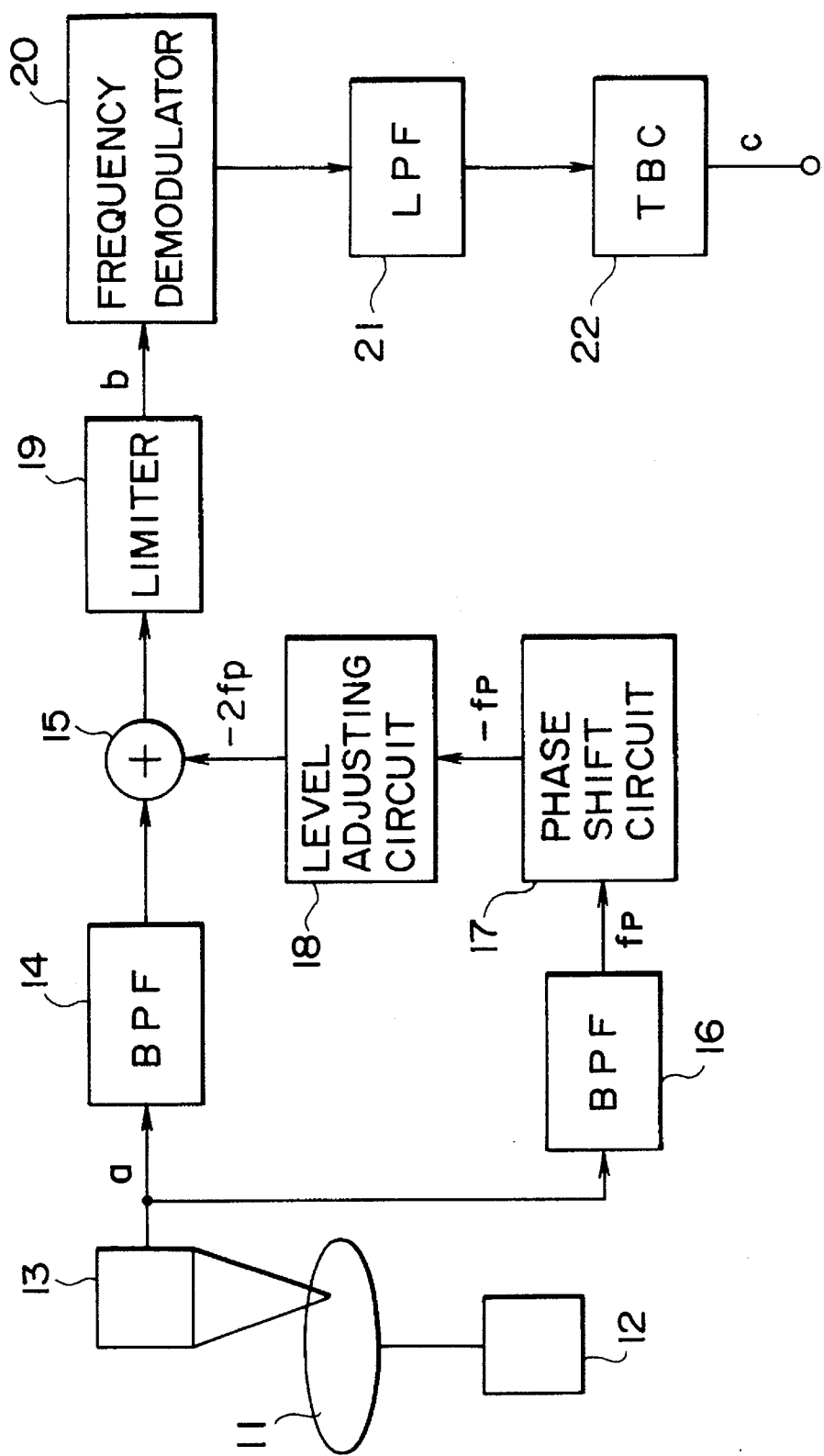
FIG. 7 is a block diagram of a signal demodulating apparatus applied in a video disc player and practiced as a first embodiment of the invention.
Figure 8A:
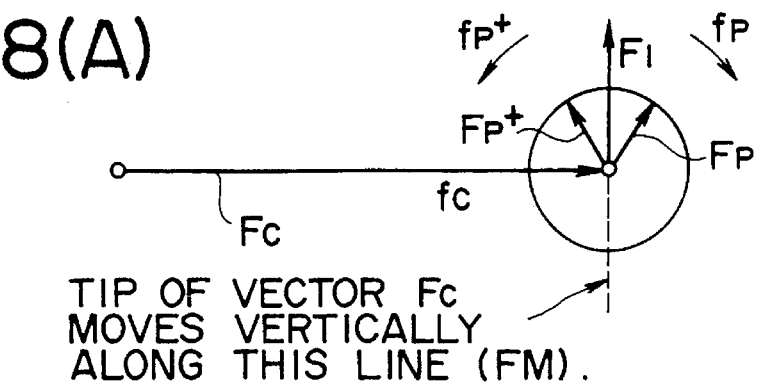
FIG. 8A–8D are a set of vector diagrams illustrating how the embodiment of FIG. 7 works.
Figure 8B:
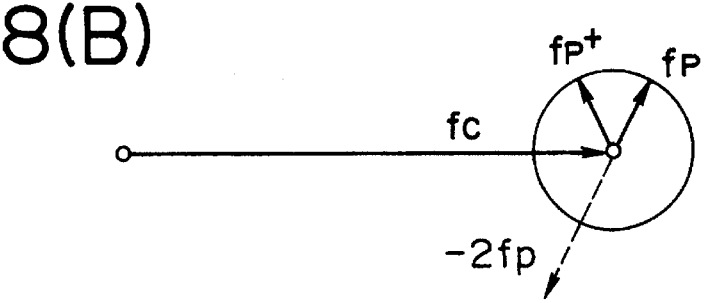
Figure 8C:
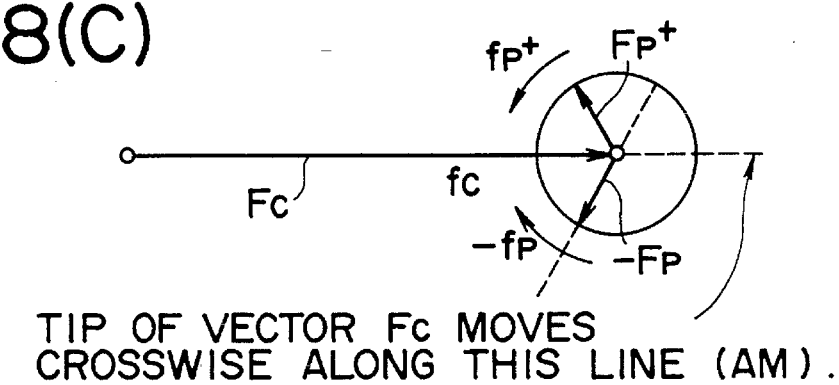
Figure 8D:
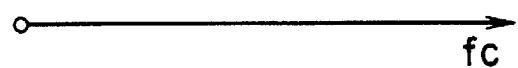

Preferred embodiments of the invention will now be described with reference to the accompanying drawings. FIG. 7 is a block diagram of a signal demodulating apparatus applied in a video disc player and practiced as the first embodiment of the invention. In FIG. 1, a video disc 11 contains Hi-vision video signals in the MUSE format. The video disc 11 is rotated by a spindle motor 12. An optical head 13 emits a laser beam to the video disc 11 and reproduces from the reflected light the signals recorded on the disc.

RF signals derived from the optical head 13 are fed to band-pass filters (BPF's) 14 and 16. Of the input signals, those signals in the frequency band centering on 12.5 MHz (i.e., main carrier fc) are extracted by the BPF 14 and sent to an adder 15. The BPF 16 derives a pilot signal fp at 2.3 MHz from the RF signals and supplies the derived pilot signal to a phase shift circuit 17. The phase shift circuit 17 inverts the phase of the received pilot signal fp before supplying the signal to a level adjusting circuit 18. The level adjusting circuit doubles the level of the pilot signal received from the phase shift circuit 17, and supplies the result to the adder 15.

The adder 15 adds the output of the BPF 14 (a mixture of the main carrier fc, the pilot signal (lower sideband) fp and the upper sideband fp+) and the output of the level adjusting circuit 18. The result of the addition is supplied to a limiter 19. The limiter 19 limits the mixed signal from the adder 15 to a predetermined level and supplies the limited result to a frequency demodulator 20. The frequency demodulator 20 frequency-demodulates the output of the limiter 19 and supplies the demodulated result to a TBC (time base corrector) circuit 22.

In operation, the optical head 13 first plays back the video disc 11 to reproduce RF signals therefrom. The reproduced RF signals are supplied to the BPF's 14 and 16. The RF signals including the main carrier (FM signal) fc and having frequencies lower than that of the latter are extracted by the BPF 14 and supplied to the adder 15. On the other hand, the pilot signal fp is extracted by the BPF 16 and fed to the phase shift circuit 17. The phase shift circuit 17 inverts the phase of the received pilot signal fp by 180 degrees (i.e., to the opposite phase) before supplying the pilot signal to the level adjusting circuit 18. The level adjusting circuit 18 doubles the level of the opposite-phase pilot signal −fp and supplies the result to the adder 15. The adder 15 adds the output of the BPF 14 and the pilot signal −2fp having the opposite phase and the doubled level, and supplies the result to the limiter 19. The limiter 19 limits the level of the mixed signal from the adder 15 to a predetermined level.

The operations above will be described below in more detail with reference to FIG. 8. As described, the signals reproduced from the video disc 11 by the optical head 13 comprise the main carrier fc and the upper and lower sidebands fp and fp+. These signal components have those phase relations with one another which are illustrated in FIG. 8 (A). The BPF 16 derives the lower sideband fp from the rest, and the phase shift circuit 17 derives the opposite-phase pilot signal −fp from the lower sideband. The level adjusting circuit 18 doubles the level of the opposite-phase pilot signal −fp to produce the pilot signal −2fp. The adder 15 adds the pilot signal −2fp to the lower sideband fp fed from the BPF 14. The output signals of the adder 15 take on the characteristics shown in FIG. 8 (C).

Specifically, the vector −Fp corresponding to the lower sideband −fp of the opposite phase and the vector Fp+ corresponding to the upper sideband fp+ rotate around the tip of the vector Fc of the main carrier fc in the directions opposite to each other. As a result, in the combined vector of FIG. 8 (C), the tip of the vector Fc moves crosswise. That is, the FM component is removed from the mixed signal, leaving the AM component alone. The signal of FIG. 8 (C) is then limited by the limiter 19 to a predetermined level. This affords the main carrier (FM signal) fc completely rid of the pilot signal component.

After the process above, the output fc of the limiter 19 is supplied to the frequency demodulator 20 for frequency demodulation. This arrangement suppresses almost all beat interference caused by the pilot signal component. The frequency-demodulated signal from the frequency demodulator 20 is rid of its unnecessary radio frequency component by a low-pass filter (LPF) 21 before supplying the TBC circuit for time base error correction. The time base error-corrected signal is then supplied to a CRT or the like, not shown, for display.

FIG. 9 is a set of frequency spectrum diagrams showing the energy spectrum of each of the components constituting the embodiment of FIG. 7. FIG. 9 (A) illustrates the frequency spectrum of the RF signal derived from the optical head 13. As illustrated, the RF signal comprises a lower sideband of 2.28 MHz (=about 2.3 MHz) at −22 dB and an upper sideband of 18.9 MHz at −33 dB.

FIG. 9 (B) depicts the frequency spectrum of the output from the limiter 19, and FIG. 9 (C) shows the frequency spectrum of the output from the TBC circuit 22. As illustrated in FIG. 9 (B), the level of the lower sideband, at −34 dB when the output of the level adjusting circuit 18 is not added by the adder 15, is brought to −47 dB when the addition does take place. Similarly, the level of the upper sideband, at −37 dB when the output of the level adjusting circuit 18 is not added by the adder 15, is attenuated to −48 dB when the addition is carried out. In FIG. 9 (C), the level of the interference beat carrier of 8.3 MHz is reduced, when the output of the level adjusting circuit 18 is added by the adder 15, by 14 dB from the level in effect when the addition is not performed.

Figure 10:
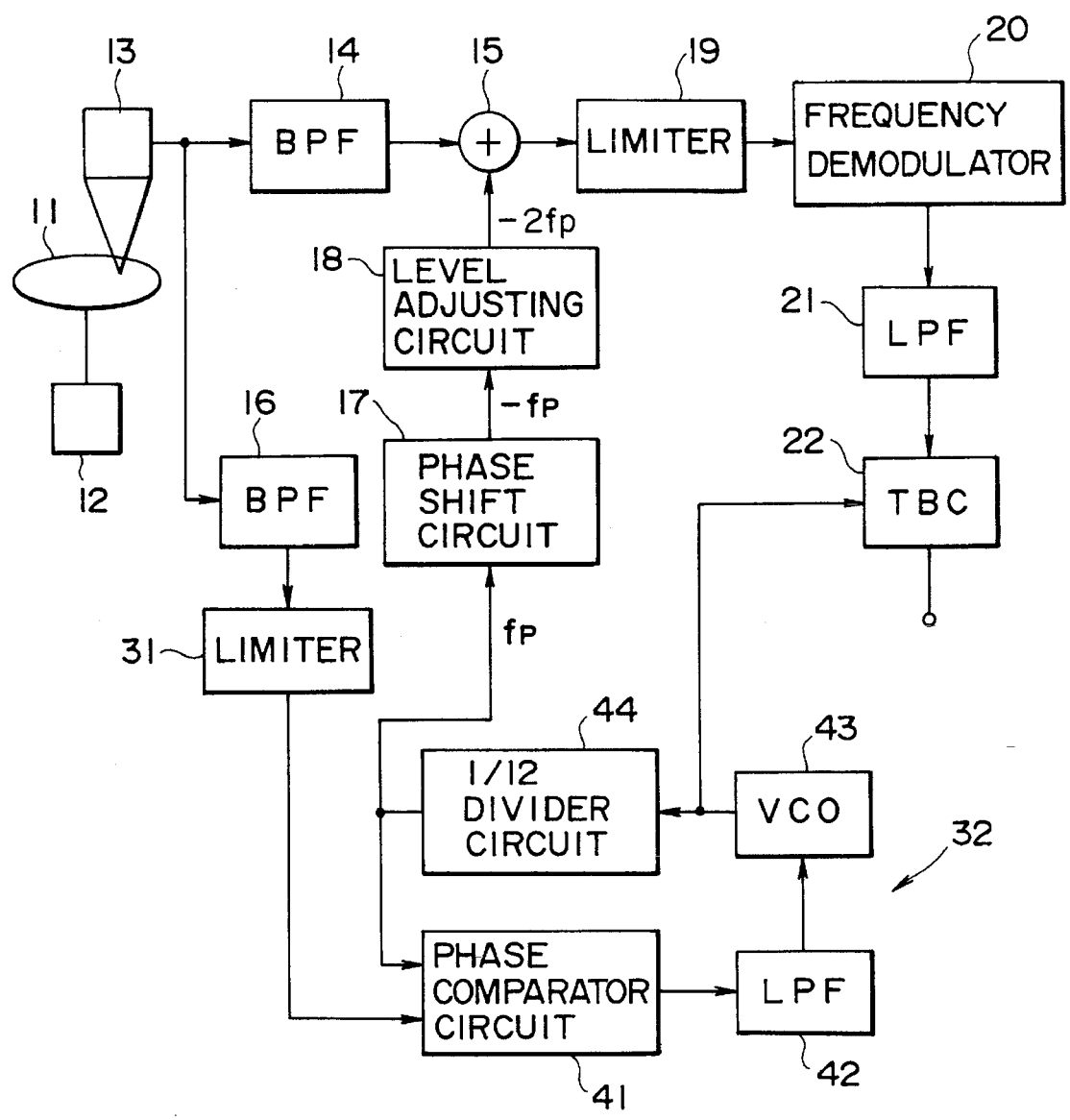
FIG. 10 is a block diagram of a signal demodulating apparatus applied in a video disc player and practiced as a second embodiment of the invention.

FIG. 10 is a block diagram of a signal demodulating apparatus applied in a video disc player and practiced as the second embodiment of the invention. Of the parts in FIG. 10, those also shown in FIG. 7 are designated by like reference numerals. In the second embodiment, the output of the band-pass filter (BPF) 16 is supplied to a PLL circuit 32 via a limiter 31. The PLL circuit 32 comprises a phase comparator circuit 41, a low-pass filter (LPF) 42, a voltage-controlled oscillator (VCO) 43 and a divider circuit 44. The phase comparator circuit 41 compares phase of the signal supplied from the limiter 31 with a phase of the output of the divider circuit 44, and generates any phase error detected. The LPF 42 extracts the low-pass component from the output of the phase comparator circuit 41. The voltage-controlled oscillator (VCO) 43 generates clock pulses in accordance with the output of the LPF 42. The divider circuit 44 divides the output of the VCO 43 by 12 and supplies the result to the phase comparator circuit 41 and phase shift circuit 17. The output of the VCO 43 is also supplied to the TBC circuit 22. The other components of the second embodiment are identical to their counterparts in the first embodiment of FIG. 7.

In the second embodiment, the pilot signal extracted by the BPF 16 is supplied to the PLL 32 via the limiter 31 and a new pilot signal is generated in synchronism with the extracted pilot signal. As a result, if the pilot signal drops out or varies in level, the phase shift circuit 17 is supplied with a pilot signal of the stable phase and the stable level. The feature affords the second embodiment a better S/N ratio than that of the first embodiment. Originally, the TBC circuit 22 needs to be fed with a clock signal in synchronism with reproduced signals and is thus connected to a phase-locked loop circuit. If the PLL circuit is shared for supplying the pilot signal, there is no need to add a specialized circuit arrangement for the purpose. That means no cost increase is necessary for furnishing the feature described above.

In the first and the second embodiments of FIGS. 7 and 10, the amount of phase shift by the phase shift circuit 17 and the amount of level adjustment by the level adjusting circuit 18 are both fixed at a manufacturing stage. These adjustment stage may be eliminated by another embodiment, i.e., the third embodiment whose constitution is shown in FIG. 11.

Figure 11:
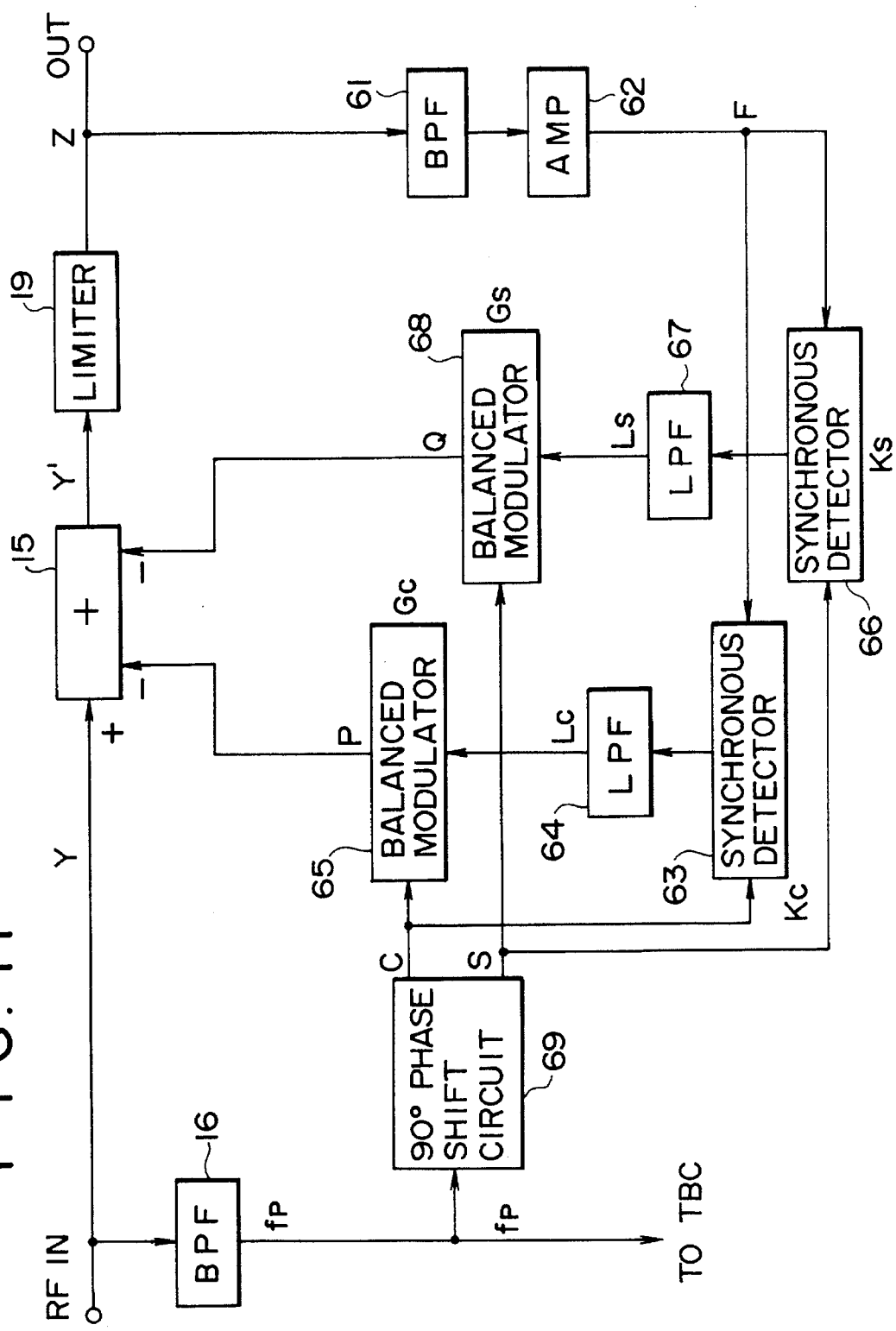
FIG. 11 is a block diagram of a signal demodulating apparatus practiced as a third embodiment of the invention.

In the third embodiment of FIG. 11, the output of the band-pass filter (BPF) 16 is fed to a phase shift circuit 69. The phase shift circuit 69 converts the received pilot signal fp into a first signal c and a second signal s, the two signals being 90 degrees apart in phase. The first signal c is supplied to a balanced modulator 65 and a synchronous detector 63 and the second signal s is supplied to a balanced modulator 68 and a synchronous detector 66. The synchronous detectors 63 and 66 synchronously detect the output of an amplifier 62 using the first and the second signals c and s, respectively, and supplies the detected output to low-pass filters (LPF's) 64 and 67. The outputs of the LPF's 64 and 67 are sent as a third and a fourth signal to the balanced modulators 65 and 68, respectively.

The balanced modulator 65 balanced-modulates the first signal c from the phase shift circuit 69 using the third signal Lc from the LPF 64, and supplies the result to the adder 15. The balanced modulator 68 balanced-modulates the second signal s from the phase shift circuit 69 using the fourth signal Ls from the LPF 67, and supplies the result to the adder 15. The adder 15 adds the outputs P and Q of the balanced modulators 65 and 68 with their polarity inverted (i.e., for subtraction) to the RF signal coming from the optical head 13, and sends the result to the limiter 19. The output of the limiter 19 is fed to the frequency demodulator 20, and part of the limiter output is supplied to a BPF 61 whereby the pilot signal component is extracted. The output of the BPF 61 is amplified by the amplifier 62, and the output of the amplifier 62 is supplied to the synchronous detectors 63 and 66 as previously described.

The third embodiment works as follows: The BPF 61 first extracts from the output of the limiter 19 the pilot signal component not removed therefrom. The pilot signal component is amplified by the amplifier 62, and the output of the amplifier 62 is fed to the synchronous detectors 63 and 66. In turn, the synchronous detectors 63 and 66 detect synchronously the pilot signal component from the amplifier 62 using the first signal c and the second signal s from the phase shift circuit 69. The low-pass components in the outputs of the synchronous detectors 63 and 66 are extracted by the LPF's 64 and 67, respectively. Thus the LPF's 64 and 67 generate the third signal Lc and the fourth signal Ls, respectively. That is, the third signal Lc and the fourth signal Ls are provided by use of the following expressions:

Lc=LPF (kc·c·F)

Ls=LPF (ks·s·F)

where, kc and ks denote the demodulation sensitivities of the synchronous detectors 63 and 66, respectively. In other words, the third signal Lc is the low-pass component represented by the product of F, c and kc, and the fourth signal Ls is the low-pass component given by the product of F, s and ks.

The balanced modulator 65 balanced-modulates the first signal c from the phase shift circuit 69 using the third signal Lc from the LPF 64. Thus the output P of the balanced modulator 65 is provided by use of the expression:

P=Lc·Gc·c where Gc denotes the modulation sensitivity of the balanced modulator 65.

The balanced modulator 68 balanced-modulates the second signal s from the phase shift circuit 69 using the fourth signal Ls from the LPF 67. Thus the output Q of the balanced modulator 68 is given by the expression:

Q=Ls·Gs·s where Gs stands for the modulation sensitivity of the balanced modulator 68.

As described, the signal Y supplied to the adder 15 contains the main carrier (FM signal) fc and the lower sideband fp+ and upper sideband fp+ of the pilot signal (see FIG. 8 (A)). From the latter two signals (upper and lower sidebands), the signals P and Q generated by the balanced modulators 65 and 68 are subtracted in the adder 15. A signal representing the difference upon subtraction is derived from the adder 15. The output of the adder 15 is fed to the limiter 19 whereby the adder output is limited to a predetermined level. As a result, the sideband component is generated as described but is offset so that the pilot signal contained in the limiter output Z becomes zero. This is because the pilot signal component in the limiter output Z from the limiter 19 is extracted by the BPF 61 and detected by the synchronous detectors 63 and 66 for control processing.

Consequently, the BPF 61, the amplifier 62, the synchronous detectors 63 and 66, the LPF's 64 and 67, the balanced modulators 65 and 68, and the adder 15 combine to form a feedback loop that automatically removes the pilot signal component.

Figure 12:
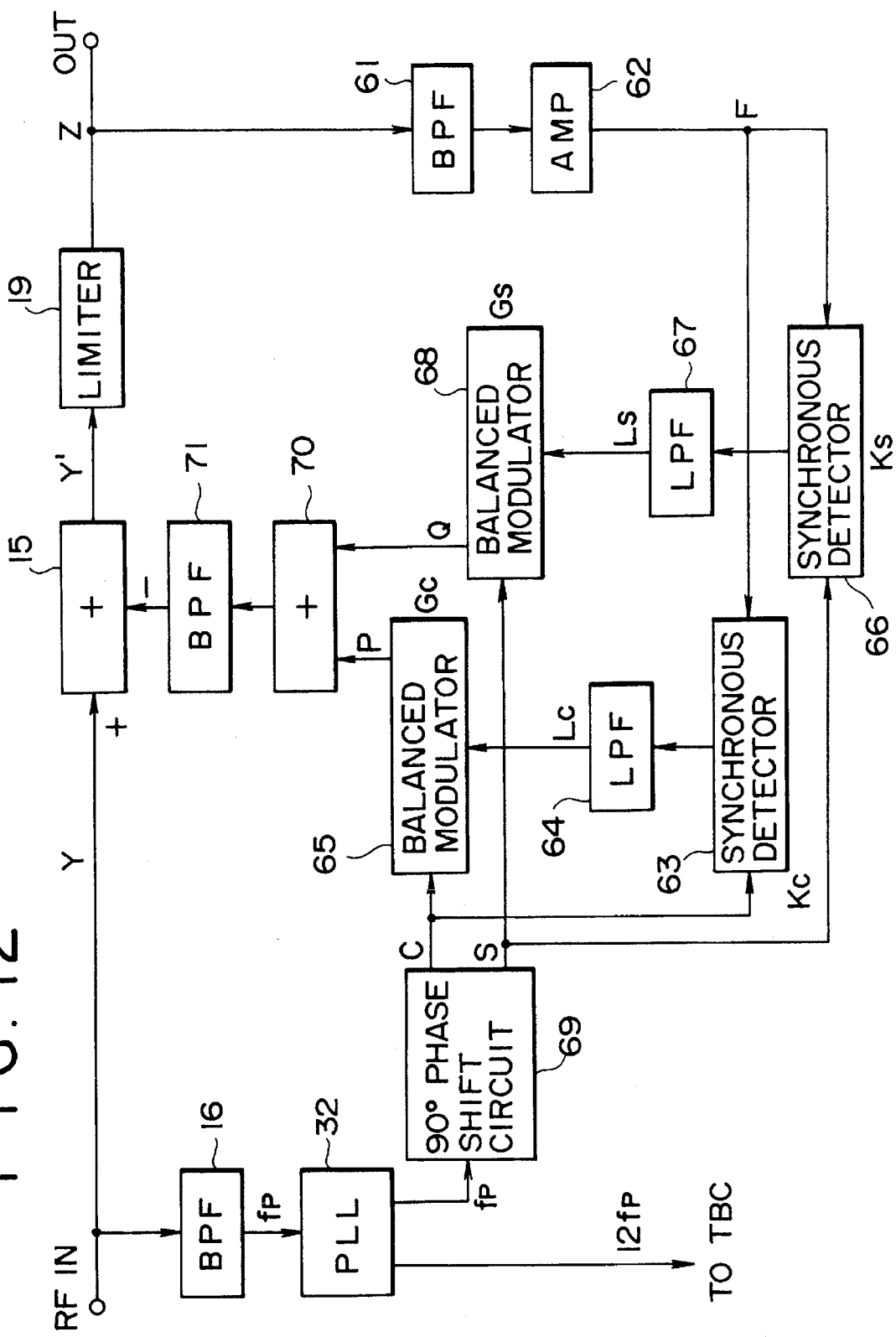
FIG. 12 is a block diagram of a signal demodulating apparatus practiced as a fourth embodiment of the invention.

In the third embodiment of FIG. 11, the output of the BPF 16 is fed direct to the phase shift circuit 69. This arrangement can let the S/N ratio of the output signal deteriorate due to the change in the pilot signal entered into the adder 15 for canceling purposes. This disadvantage is circumvented by another embodiment, i.e., the fourth embodiment whose constitution is shown in FIG. 12. As with the second embodiment of FIG. 10, the fourth embodiment of FIG. 12 has the PLL circuit 32 interposed between the BPF 16 and the phase shift circuit 69 so that the pilot signal fp generated by the PLL circuit 32 will be fed to the phase shift circuit 69.

While the third embodiment of FIG. 11 has the outputs of the balanced modulators 65 and 68 supplied direct to the adder 15, the fourth embodiment of FIG. 12 allows the outputs of the balanced modulators 65 and 68 to be supplied to an adder 70 for addition. The output of the adder 70 is fed the adder 15 via a BPF 71. If the signals P and Q generated by the balanced modulators 65 and 68 include any distortion, the pilot signal could not be canceled precisely, except that the BPF 71 removes the signal component containing that distortion. This allows the pilot signal to be canceled more accurately than before.

The video disc 11 has one frame of video signals recorded thereon per revolution. The Hi-vision (i.e., MUSE-format) video signal is made of 1,125 horizontal scanning lines per frame. The frequency of the pilot signal is set to 135/2 times that of the horizontal scanning lines. In other words, the pilot signal occurs at a rate of 135/2 waves per horizontal scanning period. Thus the number of pilot signal waves per frame (one revolution of video disc 11) is 75,937+½(=1,125× 135÷2). This means that if the optical head 13 jumps one track on the video disc 11, the pilot signal becomes 180 degrees out of phase.

Figure 13:
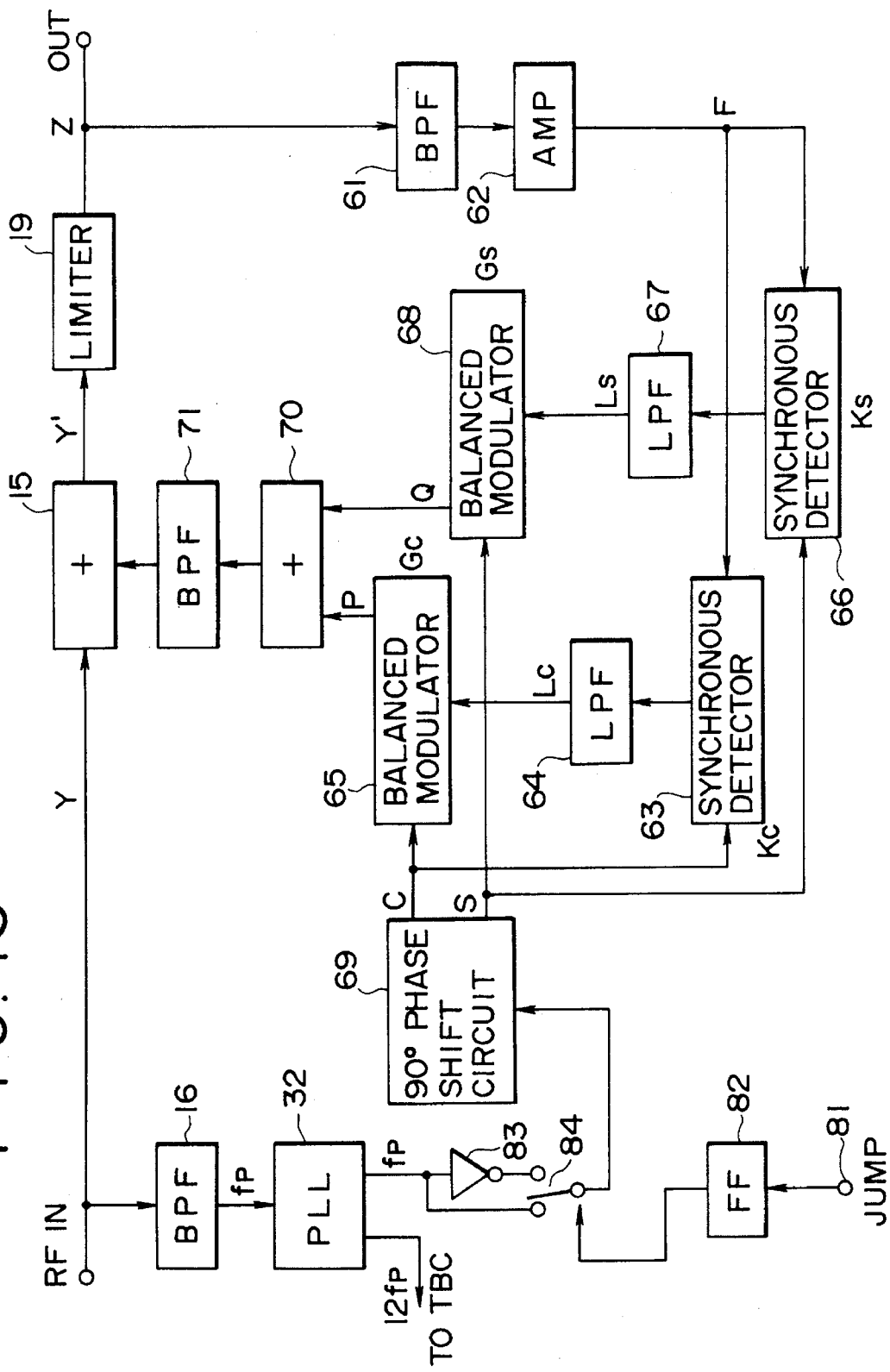
FIG. 13 is a block diagram of a signal demodulating apparatus practiced as a fifth embodiment of the invention.

This disadvantage is circumvented by the fifth embodiment of FIG. 13 in which the pilot signal fp derived from the PLL circuit 32 is inverted in phase by an inverter 83 before being sent to the phase shift circuit 69. In this setup, an input terminal 81 first admits a command ordering the optical head 13 to jump one track. Given the jump command, a flip-flop circuit 82 inverts the logic of its output. A switch 84 is set illustratively to the left side (see FIG. 13) if the logic output of the flip-flop circuit 82 is "1" and to the right if the logic output is "0." This causes the phase of the pilot signal fp generated by the PLL circuit 32 to be inverted 180 degrees every time the optical head 13 jumps to the adjacent track. The phase-inverted pilot signal is sent to the phase shift circuit 69. This prevents the pilot signal input to the adder 15 and the signals P and Q generated by the balanced modulators 65 and 68 from getting out of phase with one other immediately after a track jump, thereby affording the unfailing cancellation of the pilot signal component.

Figure 14A:
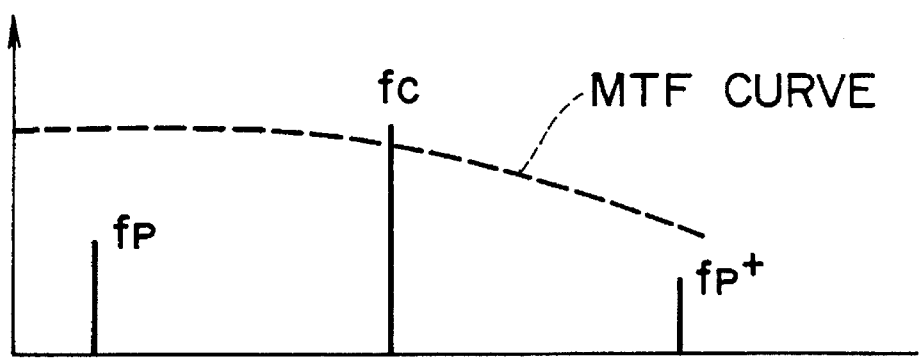
FIG. 14A–14B are a set of views depicting how the upper sideband is affected by an MTF characteristic.
Figure 14B:
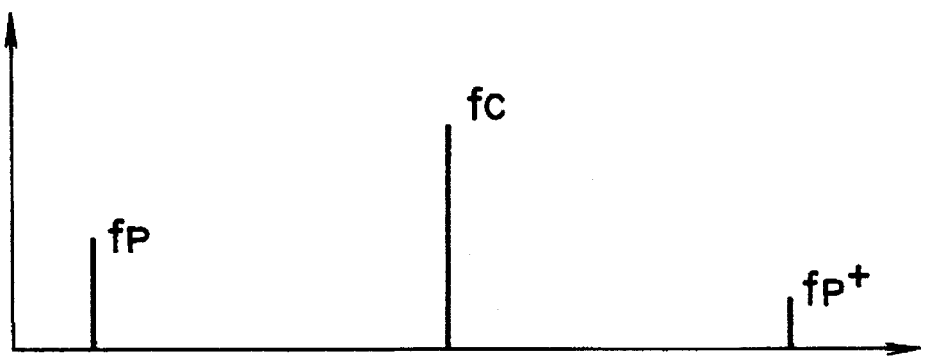

In the fifth embodiment of FIG. 13, the inverter 83 is used to invert the phase of the pilot signal. Alternatively, the phase of the pilot signal may be inverted by use of the PLL circuit 32 or phase shift circuit 69.

Where the frequency of the FM signal fc as the main carrier is low, the interference frequency (fc–fp) resulting from the pilot signal fp also becomes low and the beat interference involved tends to be pronounced. If the main carrier fc is heightened in frequency, the interference frequency (fc–fp) is raised out of the MUSE signal band. This makes beat interference less conspicuous.

Where the frequency of the main carrier fc goes up and down, the levels of the upper and lower sidebands become unbalanced under the influence of the MTF (modulation transfer function) characteristic involving the optical head 13. The higher the frequency component, the lower the output level thereof. This is because the MTF characteristic is similar to the characteristic of the low-pass filter. Consequently, as shown in FIG. 14 (A), low frequencies of the main carrier fc entail relatively low frequencies of the upper sideband fp+. This leaves the level of the upper sideband fp+ relatively high. When the frequency of the main carrier fc is raised, the frequency of the upper sideband fp+ also goes up, as depicted in FIG. 14 (B). Thus the level of the upper sideband fp+ in FIG. 14 (B) becomes lower than that in FIG. 14 (A). As a result, the level of the pilot signal to be canceled at low frequencies of the main carrier fc differs from the level at high frequencies. Where any one of the third through the fifth embodiments in FIGS. 11 through 13 is utilized, the appropriate level of the pilot signal to be canceled is set appropriately and automatically despite the above-described unbalanced levels of the upper and lower sidebands.

It should be noted that the outputs of the LPF's 64 and 67 constitute the low-pass component in the varying contents of the pilot signal from the limiter 19. This means that it is difficult to respond to these outputs very quickly. For example, abrupt transition from a relatively bright picture to a dark one can involve pronounced beat interference immediately after the changeover. This disadvantage is bypassed by another embodiment, i.e., the sixth embodiment whose constitution is shown in FIG. 15.

Figure 15:
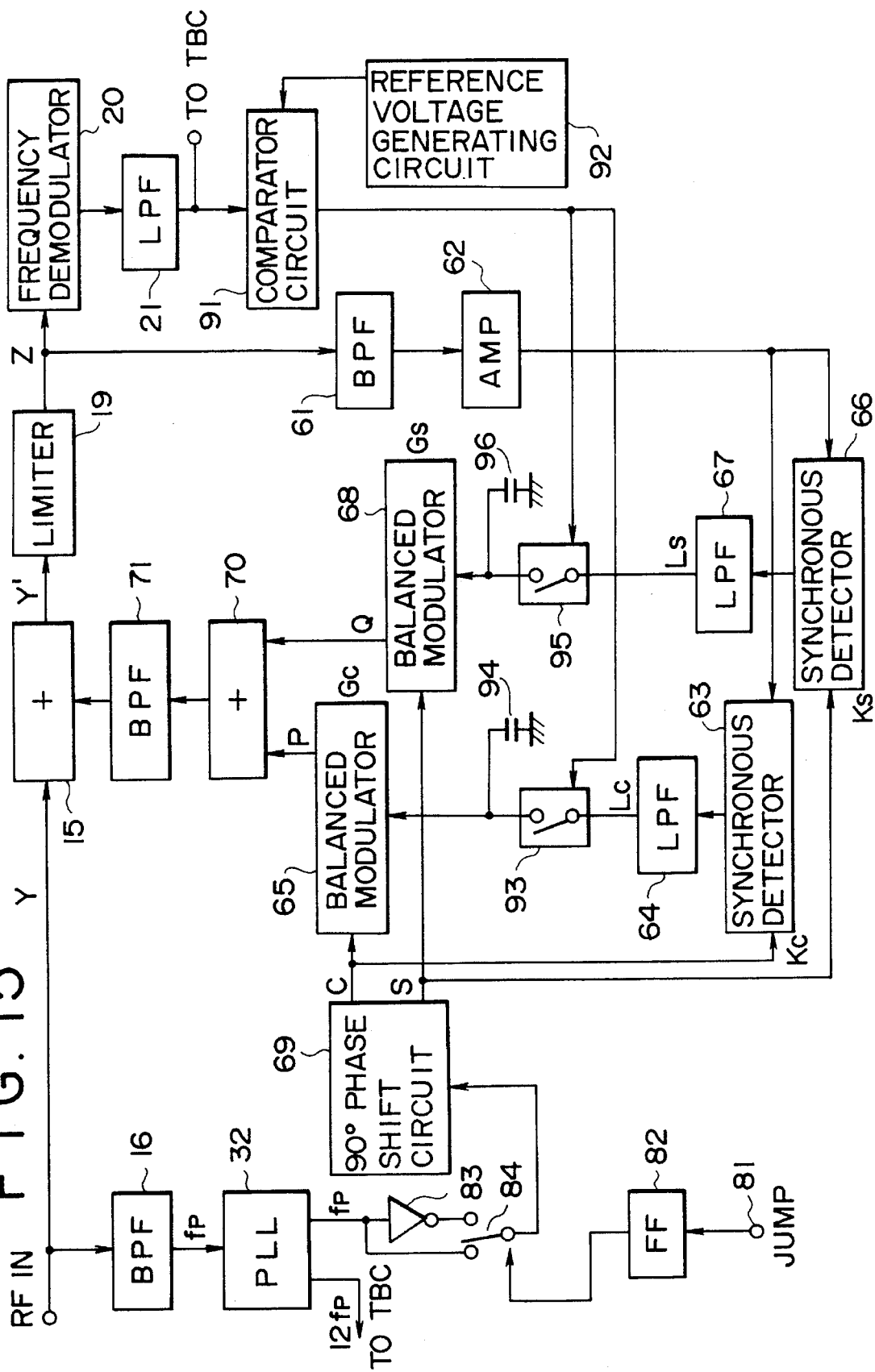
FIG. 15 is a block diagram of a signal demodulating apparatus practiced as a sixth embodiment of the invention.

The sixth embodiment of FIG. 15 has the outputs of the LPF's 64 and 67 fed to the balanced modulators 65 and 68 via switches 93 and 95, respectively. Voltage-holding capacitors 94 and 96 are interposed between the switches 93 and 96 on the one hand, and the balanced modulators 65 and 68 on the other. The switches 93 and 95 are controlled by a comparator circuit 91. The comparator circuit 91 compares the reference voltage generated by a reference voltage generating circuit 92 with the level of the signal from the LPF 21.

That is, the comparator circuit 91 compares the level of the video signal from the LPF with the reference voltage from the reference voltage generating circuit 92. The reference voltage derived from the reference voltage generating circuit 92 is set to a threshold voltage corresponding to the brightness of pictures wherein beat interference is conspicuous (e.g., a 20% voltage with respect to the 100% voltage for the brightest picture). The comparator circuit 91 turns on the switches 93 and 95 when the level of the video signal demodulated by the frequency demodulator 22 is lower than the reference voltage; the switches 93 and 95 are turned off when the level of the video signal is higher than the reference voltage (i.e., for brighter pictures with the main carrier fc at higher frequencies). As a result, when the level of the video signal is lower than the predetermined reference value (i.e., for dark pictures), a servo loop is activated to cancel the pilot signal contained in the signal supplied to the adder 15.

For brighter pictures, the switches 93 and 95 are turned off. However, the output voltages of the LPF's 64 and 67 in effect immediately before the switches 93 and 95 were turned off are held in the capacitors 94 and 96. Later, when a change from the bright picture back to a dark picture causes the switches 93 and 95 to be turned on, the voltages held in the capacitors 94 and 96 are used quickly to start canceling the pilot signal. Thus beat interference is minimized immediately after the changeover from the bright to the dark picture.

The sixth embodiment of FIG. 15 causes the pilot signal component to be canceled even in the bright picture by use of the voltages held in the capacitors 94 and 96. Alternatively, the canceling of the pilot signal may be stopped completely whenever a bright picture is detected. The alternative arrangement is viable because beat interference is not conspicuous in bright pictures. The arrangement is implemented illustratively by interposing a switch between the adder 70 and the BPF 71. This switch is operated in response to the output of the comparator circuit 91: turned off when a bright picture is detected and turned on when a dark picture is detected.

Although the description above contains many specificities, these should not be construed as limiting the scope of the invention but as merely providing illustrations of some of the presently preferred embodiments of this invention. For example, the invention may be applied not only to the video disc player, as described above, but also to any other apparatuses in which the frequency-modulated signal is demodulated from the transmitted signal mixture comprising the frequency-modulated signal and the pilot signal.

Thus the scope of the invention should be determined by the appended claims and their legal equivalents, rather than by the examples given.

What is claimed is:

1. A signal demodulating apparatus for demodulating frequency-modulated video signals on which pilot signals are mixed, comprising:

input means for receiving the pilot signal-mixed frequency-modulated video signals;

first deriving means connected to said input means for deriving a first pilot signal from said pilot signal-mixed frequency-modulated video signals;

pilot canceling signal generating means connected to said first deriving means for generating a pilot canceling signal;

mixing means connected to said input means and said pilot canceling signal generating means for mixing said pilot signal-mixed frequency-modulated video signals and said pilot canceling signal;

limiting means connected to said mixing means for limiting the pilot canceled frequency-modulated video signals to a predetermined level;

demodulating means connected to said limiting means for demodulating said frequency-modulated video signals; and second deriving means connected between said limiting means and said demodulating means for deriving a second pilot signal from said pilot canceled frequency-modulated video signal, said second pilot signal being supplied to said pilot canceling signal generating means, wherein said pilot canceling signal generating means generates said pilot canceling signal based on said first and second derived pilot signals.

2. A signal demodulating apparatus according to claim 1, wherein said pilot canceling signal generating means includes a phase locked loop circuit which is supplied with said first pilot signal from said first deriving means.

3. A signal demodulating apparatus according to claim 2, further comprising:

time base corrector means connected to said demodulating means for removing any time base error in said demodulated video signals.

4. A signal demodulating apparatus according to claim 1, wherein said first deriving means includes a band pass filter circuit.

5. A signal demodulating apparatus according to claim 1, wherein said frequency-modulated video signals are MUSE video signals and said first and second pilot signals are signals of about 2.3 MHz.

6. A signal demodulating apparatus according to claim 1, wherein said pilot canceling signal generating means includes a phase inverting circuit and a signal level adjusting circuit for doubling the level of said first pilot signal.

7. A signal demodulating apparatus according to claim 1, wherein said pilot signal-mixed-frequency-modulated video signals are obtained from a video disc.

8. A signal demodulating apparatus according to claim 1, wherein said pilot canceling signal generating means includes phase shift means connected to said first deriving means for generating a pair of intermediate signals, each of said intermediate signals being supplied to one of a pair of synchronizing detecting means and one of a pair of balanced modulating means.

9. A signal demodulating apparatus according to claim 8, wherein said second pilot signal derived from said second deriving means is supplied to said pair of synchronizing detecting means, each signal output from said pair of synchronizing detecting means being supplied to one of said balanced modulating means via a low pass filter means, whereby a pair of signals output from said balanced modulating means are supplied to said mixing means.

10. A signal demodulating apparatus according to claim 9, wherein said signals output from said pair of balanced modulating means are supplied to said mixing means via an adding circuit and a band pass filter circuit.

11. A signal demodulating apparatus according to claim 8, wherein said pilot canceling signal generating means further includes a phase locked loop circuit connected between said phase shift means and said first deriving means for receiving said first derived pilot signal from said first deriving means.

12. A signal demodulating apparatus according to claim 11, wherein said pilot signal canceling means further includes a phase inverting circuit connected between said phase shift means and said phase locked loop circuit for inverting signals to be supplied to said phase shift means.

13. A signal demodulating apparatus according to claim 8, wherein said pilot canceling signal generating means further includes a pair of switch means, each of said switch means being interposed between one of said balanced modulating means and said respective low pass filter means, each of said switch means being connected to a capacitor means.

14. A signal demodulating apparatus according to claim 13, further comprising:

switch signal generating means coupled to receive an output signal from said demodulating means for generating a switch signal for controlling said pair of switch means.

15. A signal demodulating apparatus according to claim 15, wherein said switch signal generating means includes a reference voltage source and comparator means for supplying said switch signal to said switch means.

\* \* \* \* \*